United States Patent
Wang (10) Patent No.: US 8,749,530 B2
(45) Date of Patent: Jun. 10, 2014

(54) OPTICAL TOUCH DISPLAY, A CALIBRATION APPARATUS AND A CALIBRATION METHOD THEREOF

(75) Inventor: Chun-Wei Wang, Taipei (TW)

(73) Assignee: Wistron Corporation, New Taipei (TW)

( * ) Notice: Subject to any disclaimer, the term of this patent is extended or adjusted under 35 U.S.C. 154(b) by 112 days.

(21) Appl. No.: 13/567,742

(22) Filed: Aug. 6, 2012

(65) Prior Publication Data

US 2013/0127785 A1    May 23, 2013

(30) Foreign Application Priority Data

Nov. 21, 2011  (TW) .............................. 100142601 A (51) Int. Cl.
G06F 3/042 (2006.01)

(52) U.S. Cl.
USPC ........................................ 345/175; 178/18.09

(58) Field of Classification Search
CPC ........ G06F 3/039; G06F 3/041; G06F 3/0428
USPC ...................... 345/173–178; 178/18.01–18.09
See application file for complete search history.

(56) References Cited

U.S. PATENT DOCUMENTS

| | | | |
|---|---|---|---|
| 7,176,897 B2 | 2/2007 | Roberts | |
| 7,256,772 B2 * | 8/2007 | Morrison | ...................... 345/178 |
| 8,269,749 B2 | 9/2012 | Lin et al. | |
| 8,339,378 B2 * | 12/2012 | Chtchetinine et al. | ........ 345/175 |
| 8,462,137 B2 | 6/2013 | Lin et al. | |
| 2004/0207600 A1 * | 10/2004 | Zhang et al. | ................... 345/156 |
| 2010/0079412 A1 * | 4/2010 | Chiang et al. | ................ 345/175 |
| 2010/0315381 A1 * | 12/2010 | Yi et al. | ......................... 345/175 |
| 2010/0328270 A1 * | 12/2010 | Lin et al. | ........................ 345/175 |
| 2011/0210946 A1 * | 9/2011 | Goertz et al. | .................. 345/175 |
| 2011/0298753 A1 * | 12/2011 | Chuang et al. | ................ 345/175 |
| 2012/0038588 A1 * | 2/2012 | Li et al. | .......................... 345/175 |
| 2012/0044213 A1 * | 2/2012 | Lu et al. | ......................... 345/175 |

* cited by examiner

Primary Examiner — Hong Zhou
(74) Attorney, Agent, or Firm — Muncy, Geissler, Olds & Lowe, P.C.

(57) ABSTRACT

An optical touch display, a calibration apparatus, and a calibration method thereof are disclosed. The calibration method is used for calibrating the optical touch display, and the optical touch display has a plurality of image detecting sensors. The calibration method includes the following steps: generating a plurality of calibration points; generating a plurality of representative calibration points from the plurality of calibration points; obtaining a first image position of each representative calibration point via the plurality of image detecting sensors; constructing a coordinate transformation mechanism for transforming the first image position into a first screen position; calculating a relative position between the representative calibration points and its neighboring calibration points; calculating a second image position of each calibration point based on the relative position; and calculating a second screen position by using the transformation mechanism and the second image position.

10 Claims, 6 Drawing Sheets

OPTICAL TOUCH DISPLAY, A CALIBRATION APPARATUS AND A CALIBRATION METHOD THEREOF

BACKGROUND OF THE DISCLOSURE

1. Field of the Disclosure

The disclosure relates to a touch display; more specifically, the disclosure relates to an optical touch display, a calibration apparatus, and a calibration method thereof.

2. Description of the Related Art

Because of developments in technology and trends in the commercial market, electronic devices controlled by touch have become more and more commonplace. Due to the restriction of manufacturing costs and the efficiency, both resistive touch panels and capacitive touch panels can only be applied to small size devices such as cell phones. Nowadays, large touch displays are usually optical touch displays, using photo sensors. Optical touch displays are one fairly competitive type of large size touch display because of the low manufacturing cost and the high touch accuracy.

The principle of optical touch displays is to detect a location of fingers and then transform the location into a screen position to implement the touch feature; consequently, constructing a transformation mechanism is essential for optical touch displays. Larger touch displays require more calibration points to ensure detection accuracy. However, having more calibration points also increases the calibration time and number of steps. As a result, the calibration time and necessary labor are significantly increased, especially during mass production. These increases make the production of such devices less economical. Thus, there is a need to provide a new calibration method for optical touch displays using fewer calibration points and requiring less calibration time to meet the best calibration requirements to obviate the problem of the prior art.

SUMMARY OF THE DISCLOSURE

It is an object of the disclosure to provide an optical touch display, a calibration apparatus, and a calibration method thereof.

It is another object of the disclosure to provide a calibration method and a calibration apparatus to reduce the calibration time of an optical touch display.

It is further another object of the disclosure to provide a calibration method and a calibration apparatus to simplify the calibration steps of an optical touch display.

To achieve the abovementioned objects, the calibration method of the disclosure is applied to calibrate an optical touch display, wherein the optical touch display comprises a plurality of image detecting sensors. The calibration method of the disclosure comprises the following steps: generating a plurality of calibration points; generating a plurality of representative calibration points from the plurality of calibration points; obtaining a first image position of each representative calibration point relative to the plurality of image detecting sensors via the plurality of image detecting sensors; constructing a coordinate transformation mechanism for transforming the first image position of each representative calibration point relative to the plurality of image detecting sensors to a first screen position of each representative calibration point relative to the optical touch display; calculating a relative position between each representative calibration point and its neighboring calibration points; calculating a second image position of each calibration point relative to the plurality of the image detecting sensors based on the relative position and the first screen position; and calculating a second screen position of each calibration point relative to the optical touch display via the coordinate transformation mechanism and the second image position.

The disclosure further provides a calibration apparatus for calibrating an optical touch display. The calibration apparatus comprises a processor, a memory, a calibration template, and a touching object, wherein the memory is electrically connected to the processor; the memory stores a plurality of instructions and the processor reads the plurality of instructions to perform the following mechanism: generating a plurality of calibration points via a calibration point generating module; generating a plurality of representative calibration points from the plurality of calibration points via a representative calibration point generating module; obtaining a first image position of each representative calibration point relative to the plurality of image detecting sensors via the plurality of image detecting sensors; transforming the first image position of each representative calibration point relative to the plurality of image detecting sensors to a first screen position of each representative calibration point relative to the optical touch display via a coordinate transformation mechanism; calculating a relative position between each representative calibration point and its neighboring calibration points via a relative position generating module; calculating a second image position of each calibration point relative to the plurality of image detecting sensors via an image position calculating module based on the relative position and the first image position; and calculating a second screen position of each calibration point relative to the optical touch display via the coordinate transformation mechanism and based on the second image position.

The disclosure further provides an optical touch display comprising a plurality of image detecting sensors, a processor, and a memory, wherein the processor is electrically connected to the plurality of image detecting sensors; the memory is electrically connected to the processor; the memory stores plurality of instructions and the processor reads the plurality of instructions to perform the following mechanism: generating a plurality of calibration points via a calibration point generating module; generating a plurality of representative calibration points from the plurality of calibration points via a representative calibration point generating module; obtaining a first image position of each representative calibration point relative to the plurality of image detecting sensors via the plurality of image detecting sensors; transforming the first image position of each representative calibration point relative to the plurality of image detecting sensors to a first screen position of each representative calibration point relative to the optical touch display via a coordinate transformation mechanism; calculating a relative position between each representative calibration point and its neighboring calibration points via a relative position generating module; calculating a second image position of each calibration point relative to the plurality of image detecting sensors via an image position calculating module based on the relative position and the first image position; and calculating a second screen position of each calibration point relative to the optical touch display via the coordinate transformation mechanism and based on the second image position.

The calibrating steps and calibrating time can both be reduced by employing the calibration method of the disclosure.

DETAILED DESCRIPTION OF THE PREFERRED EMBODIMENT

The advantages and innovative features of the disclosure will become more apparent from the following detailed descriptions when taken together with the accompanying drawings.

Figure 1:
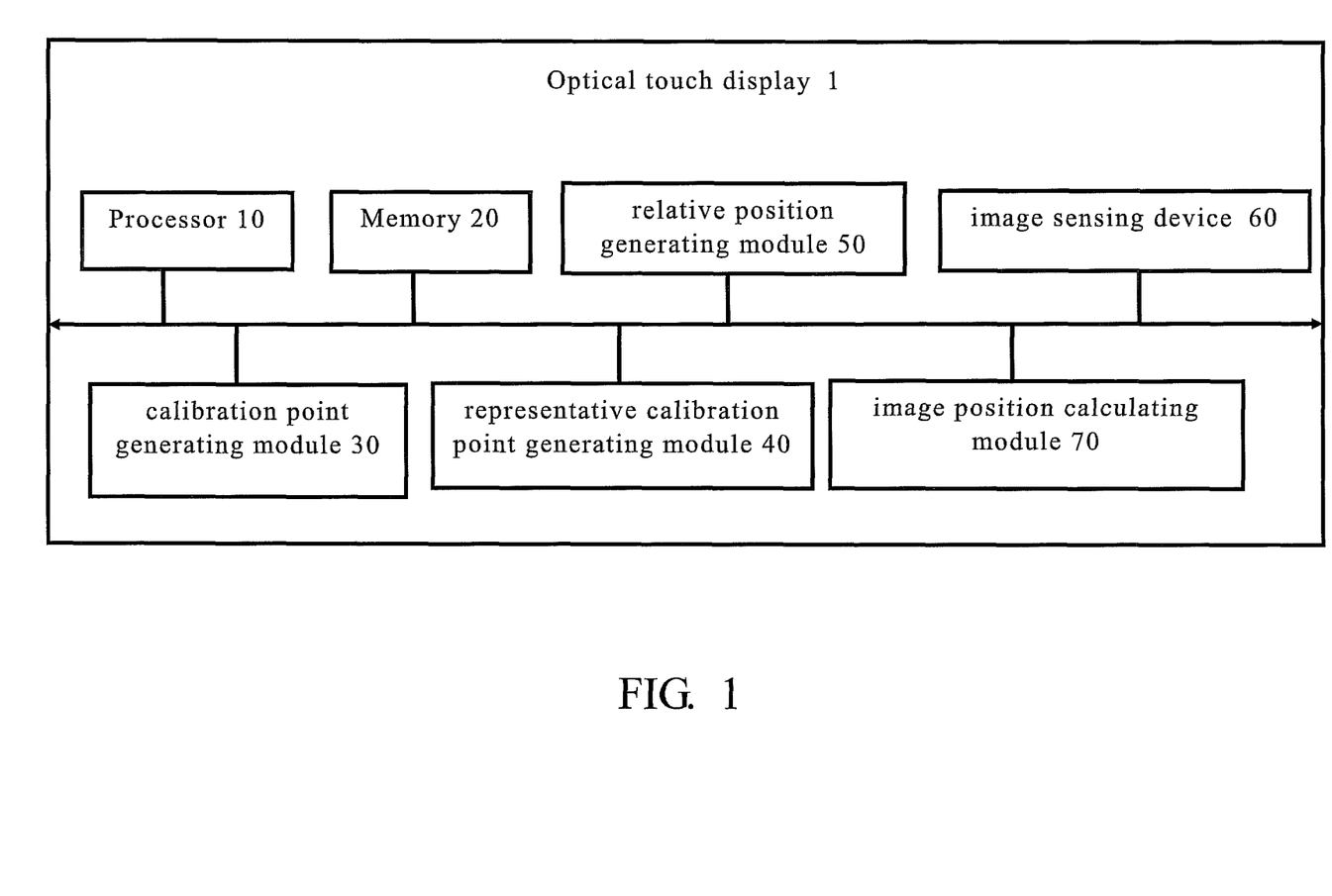
FIG. 1 is a hardware structure of the optical touch display of the disclosure.
Figure 2:
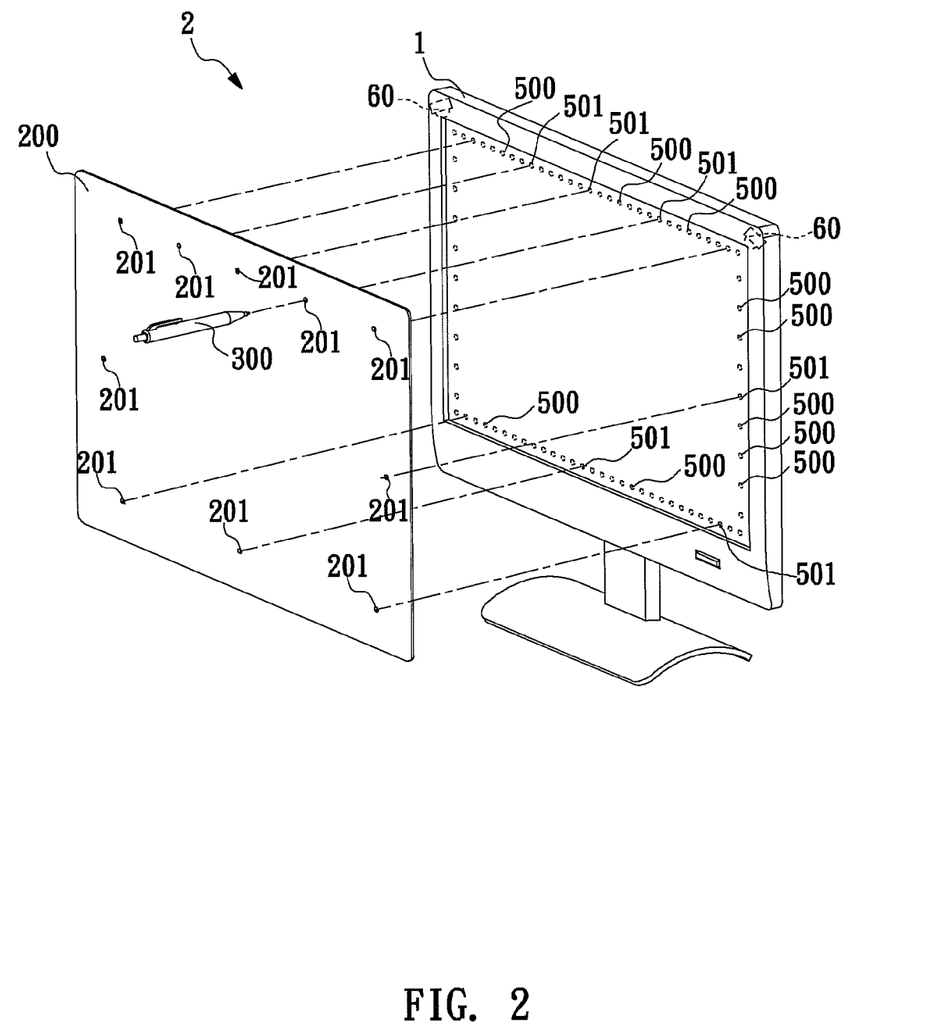
FIG. 2 is a schematic drawing of the calibration apparatus and the optical touch display of the disclosure.
Figure 3:
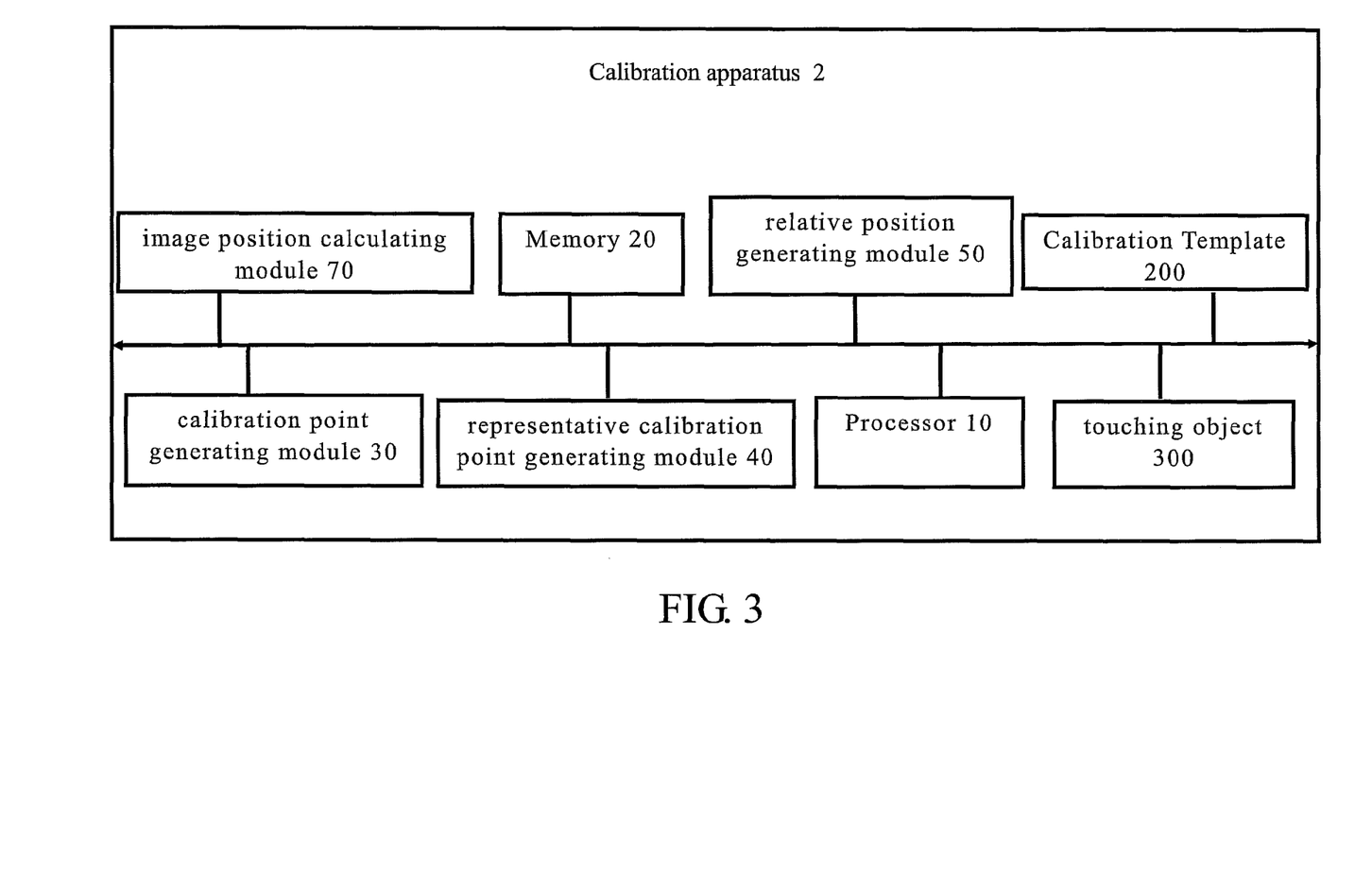
FIG. 3 is a hardware structure of the calibration apparatus of the disclosure.

Please refer to FIG. 1 to FIG. 3, wherein FIG. 1 is a hardware structure of the optical touch display of the disclosure; FIG. 2 is a schematic drawing of the calibration apparatus and the optical touch display of the disclosure; and FIG. 3 is a hardware structure of the calibration apparatus of the disclosure.

As shown in FIG. 1 and FIG. 2, according to one embodiment of the disclosure, the optical touch display 1 of the disclosure comprises two image detecting sensors 60, a processor 10, and a memory 20, wherein the processor 10 is electrically connected to the plurality of image detecting sensors 60. The memory 20 is electrically connected to the processor 10; the memory 10 stores a plurality of instructions and the processor 10 reads the plurality of instructions to perform the following mechanism: generating a plurality of calibration points 500 on the optical touch display 1 via a calibration point generating module 30; generating a plurality of representative calibration points 501 from the plurality of calibration points 500 via a representative calibration point generating module 40; obtaining a first image position of each representative calibration point 501 relative to the plurality of image detecting sensors 60 via the plurality of image detecting sensors 60; transforming the first image position of each representative calibration point 501 relative to the plurality of image detecting sensors 60 to a first screen position of each representative calibration point 501 relative to the optical touch display 1 via a coordinate transformation mechanism 120; calculating a relative position between each representative calibration point 501 and its neighboring calibration points via a relative position generating module 50; calculating a second image position of each calibration point 500 relative to the plurality of image detecting sensors 60 via an image position calculating module 70 based on the relative position between each representative calibration point 501 and its neighboring calibration points 500 and the first screen position of each representative calibration point 501; and calculating a second screen position of each calibration point 500 via the coordinate transformation mechanism 120 and based on the second image position.

According to one embodiment of the disclosure, the processor 10 is a control chip and the two image detecting sensors 60 are photo sensors. As shown in FIG. 2, the two image detecting sensors 60 are disposed on the left side and the right side of the upper frame of the optical touch display 1. The disclosure is not limited to the above-mentioned embodiment; the image detecting sensors 60 can be optical cameras and disposed on the top side and bottom side of the left frame of the optical touch display 1. As shown in FIG. 2, the quantity of the plurality of calibration points 500 of the disclosure is 80 and the quantity of the plurality of representative calibration points 501 is 10. However, the disclosure is not limited to the abovementioned quantities; the quantity of the calibration points 500 can be 60 or other numbers and the representative calibration points 501 can be any number. It is noted that the abovementioned modules can be software, firmware, hardware, or the combination of any two of the above-mentioned embodiments; the disclosure is not limited to this embodiment.

Methods for generating the representative calibration points 501 are not restricted, as long as each of the four sides of the optical touch display 1 has at least one representative calibration point 501. It is noted that, as shown in FIG. 2, due to the limitation of the image-capturing angle of the image detecting sensor 60, more representative calibration points 501 are required at the upper side of the display screen of the optical touch display 1; i.e., the same side where the two image detecting sensors 60 are disposed. In this embodiment, there are 5 representative calibration points 501 on the upper side, where the two image detecting sensors 60 are disposed, to ensure the calibration accuracy of the upper side of the display screen of the optical touch display 1.

As shown in FIG. 2 and FIG. 3, the calibration apparatus 2 of the disclosure can be used for calibrating an optical touch display 1, wherein the optical touch display 1 of this embodiment comprises two image detecting sensors 60. The calibration apparatus 2 comprises: a processor 10, a memory 20, a calibration template 200, and a touching object 300, wherein the processor 10 is electrically connected to the two image detecting sensors 60 of the optical touch display 1. The memory 20 is electrically connected to the processor 10, and the memory 20 stores a plurality of instructions. The processor 10 reads the plurality of instructions to perform the following mechanism: generating a plurality of calibration points 500 on the optical touch display 1 via a calibration point generating module 30; generating a plurality of representative calibration points 501 from the plurality of calibration points 500 via a representative calibration point generating module 40; obtaining a first image position of each representative calibration point 501 relative to the two image detecting sensors 60 via the two image detecting sensors 60 of the optical touch display 1 of the disclosure; transforming the first image position of each representative calibration point 501 relative to the two image detecting sensors 60 to a first screen position of each representative calibration point 501 relative to the optical touch display 1 via a coordinate transformation mechanism 120; calculating a relative position between each representative calibration point 501 and its neighboring calibration points 500 via a relative position generating module 50; calculating a second image position of each calibration point 500 relative to the plurality of image detecting sensors 60 via an image position calculating module 70, which is based on the relative position between each representative calibration point 501 and its neighboring calibration points 500 and the first screen position of each representative calibration point 501; and calculating a second screen position of each calibration point 500 relative to the optical touch display 1 via the coordinate transformation mechanism 120 and based on the second image position.

It is noted that, as shown in FIG. 2, the quantity of the plurality of calibration points 500 of the disclosure is 80 and the quantity of the plurality of representative calibration points 501 is 10. The processor 10 is a control chip, such as a Scalar IC, and the chip is disposed on the optical touch display 1. The quantity of the calibration points 500 and the representative calibration points 501 of the disclosure are not limited to the abovementioned quantities. Furthermore, the above-mentioned modules can be software, firmware, hardware, or the combination of any two of the above-mentioned embodiments; the disclosure is not limited to this embodiment.

As shown in FIG. 2, while the calibration apparatus 2 of the disclosure is employed to calibrate the optical touch display 1, the calibration template 200 covers the optical touch display 1. The calibration template 200 comprises a plurality of opening holes 201, and the quantity of the opening holes 201 matches the quantity of the representative calibration points 501. According to one embodiment of the disclosure, the quantity of the opening holes 201 is 10, and the position of each opening hole 201 matches the position of each of the ten representative calibration points 501 on the optical touch display 1. The touching object 300 is used for passing through the ten opening holes 201 and pointing to each representative calibration point 501 such that the first image position of each representative calibration point 501 relative to the two image detecting sensors 60 can be obtained via the two image detecting sensors 60. The touching object 300 of this embodiment can point to each representative calibration point 501 at the same time or respectively, but the disclosure is not limited to this embodiment. It is noted that employing the touching object 300 and the calibration template 200 can ensure that the touching object 300 is precisely pointing to a location of each representative calibration point 501. Therefore, the first image position of each representative calibration point 501 relative to two image detecting sensors 60 can be obtained accurately via the two image detecting sensors 60. The touching object 300 of this embodiment is a touching calibration rod, but the disclosure is not limited to this embodiment. Any other touching objects such as fingers or a stylus are also applicable to the disclosure.

Figure 4:
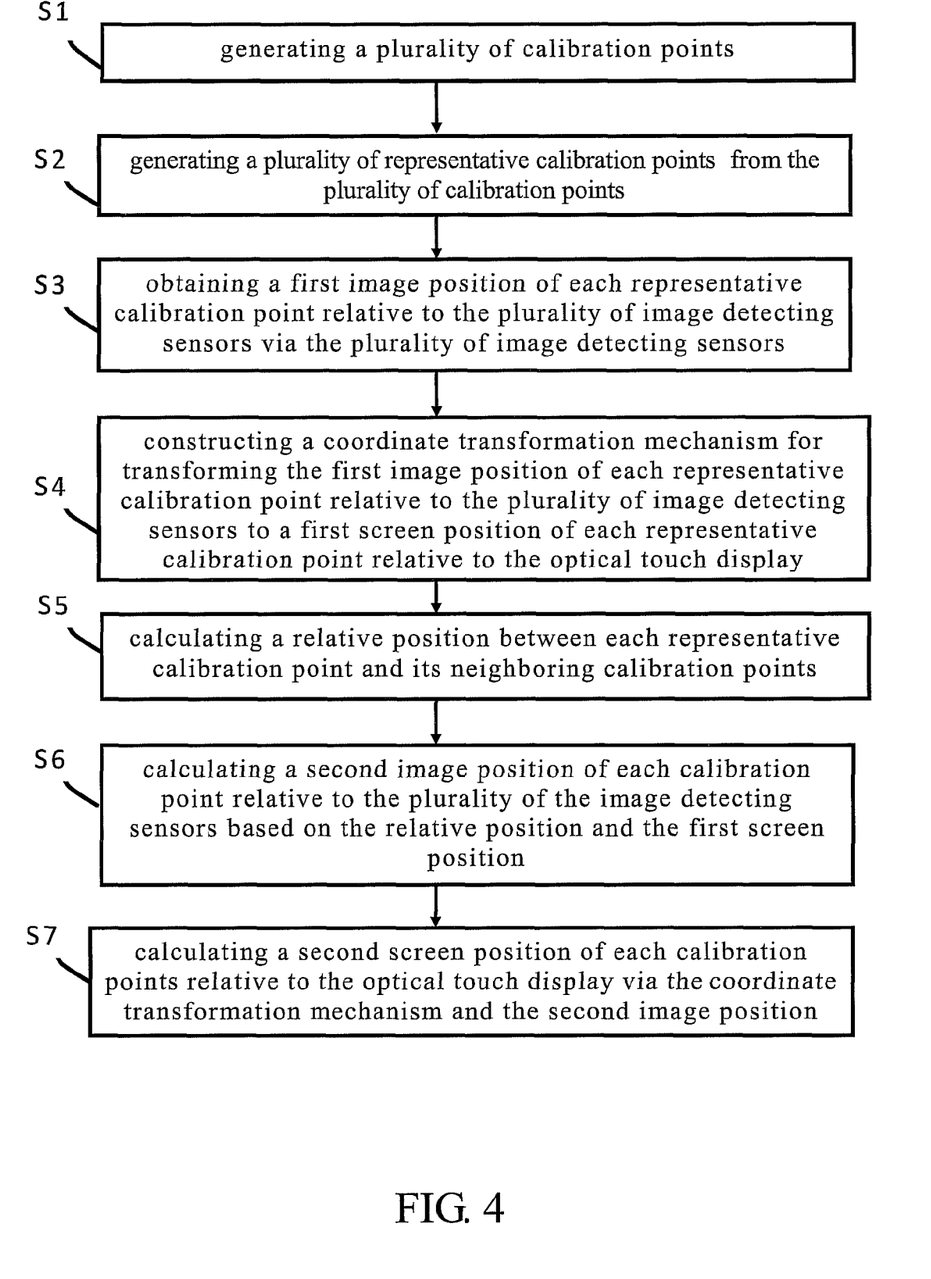
FIG. 4 is a flow chart of the calibration method of the disclosure.
Figure 5:
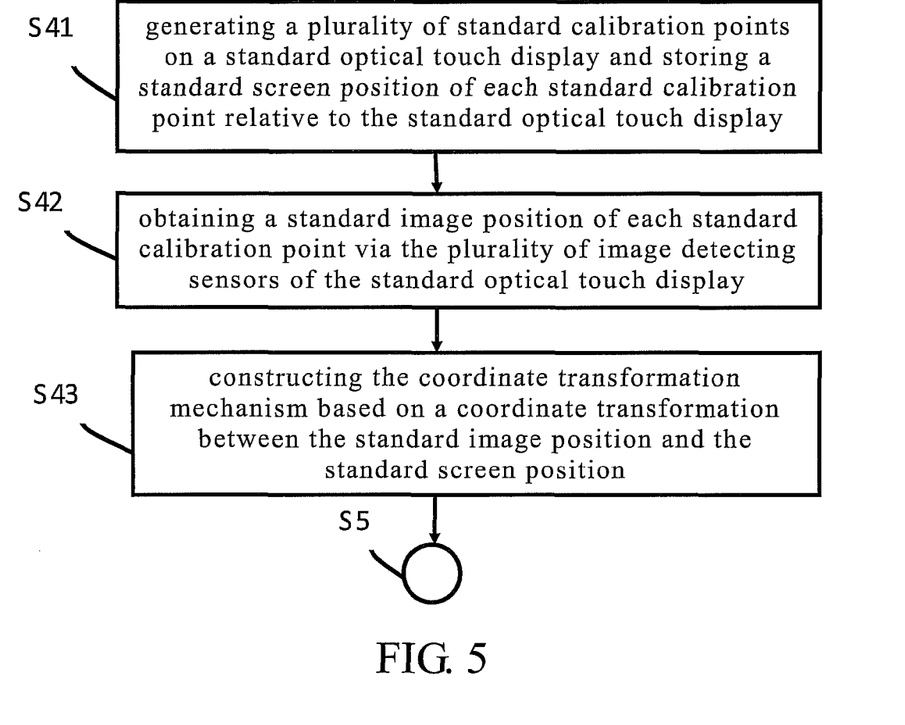
FIG. 5 is a flow chart of constructing the transformation mechanism of the disclosure.
Figure 6:
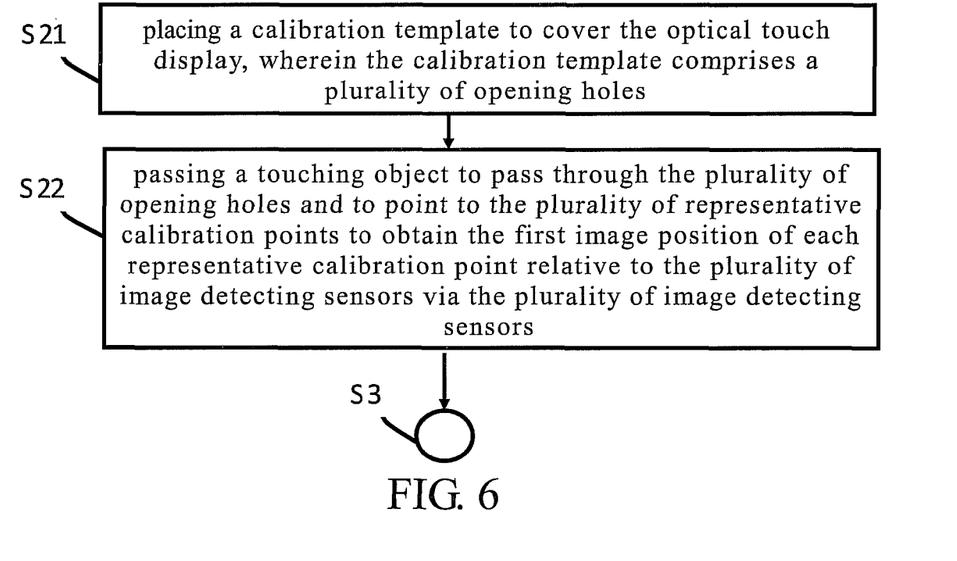
FIG. 6 is a flow chart of placing the calibration template.
Figure 7:
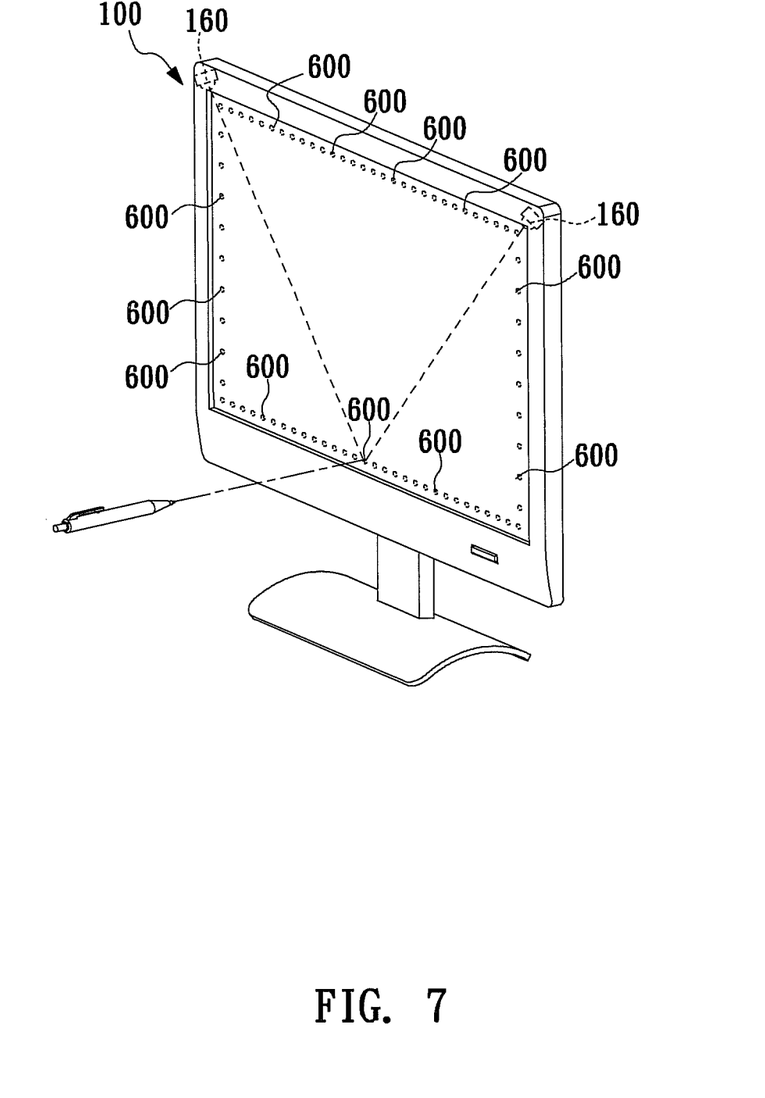
FIG. 7 is a schematic drawing of calibrating the standard optical touch display.

Please refer to FIG. 4 to FIG. 7, wherein FIG. 4 is a flow chart of the calibration method of the disclosure; FIG. 5 is a flow chart of constructing the transformation mechanism of the disclosure; FIG. 6 is a flow chart of placing the calibration template; FIG. 7 is a schematic drawing of calibrating the standard optical touch display.

The calibration method of the disclosure can be applied to the calibration apparatus 2 and the optical touch display 1 of the disclosure mentioned above. The detailed descriptions of each step of the calibration method of the disclosure are presented below and are to be read with reference to FIG. 2 and FIG. 7.

The calibration method of the disclosure is used for calibrating an optical touch display 1, wherein according to one embodiment of the disclosure, the optical touch display 1 comprises two image detecting sensors 60. The calibration method of the disclosure comprises following steps:

Step S1: generating a plurality of calibration points 500.

As shown in FIG. 2, the calibration point generating module 30 generates 80 calibration points 500 around the four sides of the display screen of the optical touch display 1 in this embodiment.

Step S2: generating a plurality of representative calibration points 501 from the plurality of calibration points 500.

As shown in FIG. 2, in this embodiment, the representative calibration point generating module 40 generates 10 representative calibration points 501 from the 80 calibration points 500. In addition, there is no particular ratio between the quantities of the representative calibration points 501 and the calibration points 500, as long as at least one representative calibration point 501 is generated at the four sides of the display screen of the optical touch display 1; i.e., each side of the display screen has at least one representative calibration point 501. It is noted that: due to the limitation of the image-capturing angle of the image detecting sensor 60, the upper side of the display screen of the optical touch display 1, which is the side on which the two image detecting sensors 60 are disposed, needs more representative calibration points 501. In this embodiment, there are 5 representative calibration points 501 on the upper side of the display screen of the optical touch display 1, which is the same side where the two image detecting sensors 60 are disposed, for ensuring the calibration accuracy of the optical touch display 1. However, the disclosure is not limited to the abovementioned embodiment; if the image detecting sensors 60 are disposed on the upper side and bottom side of the left frame of the optical touch display 1, then consequently, more representative calibration points 501 are needed on the left side of the display screen of the optical touch display 1, which is the same side where the two image detecting sensors 60 are disposed, to ensure the calibration accuracy of the optical touch display 1.

Step S3: obtaining a first image position of each representative calibration point 501 relative to the plurality of image detecting sensors 60 via the plurality of image detecting sensors 60.

The touching object 300 is employed to point to each representative calibration point 501 for allowing the two image detecting sensors 60 of the optical touch display 1 to capture the image of the touching object 300 relative to the two image detecting sensors 60 while the touching object 300 is pointing to each representative calibration point 501 (10 representative calibration points 501) such that the first screen position of each representative calibration point 501 is obtained.

Step S4: constructing a coordinate transformation mechanism 120 for transforming the first image position of each representative calibration point 501 relative to the plurality of image detecting sensors 60 to a first screen position of each representative calibration point 501 relative to the optical touch display 1.

It is noted that constructing the coordinate transformation mechanism 120 further comprises the following steps; please refer to FIG. 5.

Step S41: generating a plurality of standard calibration points 600 on a standard optical touch display 100 and storing a standard screen position of each standard calibration point 600 relative to the standard optical touch display 1.

As shown in FIG. 7, the standard optical touch display 100 is identical to the optical touch display 1 in terms of size and the specifications of the internal devices installed within it. In this embodiment, there are 80 standard calibration points 600 generated on the display screen of the standard optical touch display 100, and a standard screen position of each standard calibration points 600 relative to the standard optical touch display 100 is stored in a memory or a memory module of the standard optical touch display 100. It is noted that the standard screen positions of these 80 standard calibration points 600 on the standard optical touch display 100 are identical to the calibration points 500 of the optical touch display 1 of the disclosure; therefore, the standard optical touch display 100 can be employed as a calibration foundation for the optical touch display 1 of the disclosure.

Step S42: obtaining a standard image position of each standard calibration point 600 via a plurality of image detecting sensor 160 of the standard optical touch display 100.

In this embodiment, the two image detecting sensors 160 of the standard optical touch display 100 are employed to capture the image of the touching object 300 relative to the two image detecting sensors 160 while the touching object 300 is pointing to each of the 80 standard calibration points 600 such that the standard image positions of the 80 standard calibration points 600 relative to the two image detecting sensors 160 are obtained.

$$Y = \begin{bmatrix} 150 & 160 \\ 150 & 610 \\ 710 & 610 \\ 710 & 160 \end{bmatrix} \text{ and }$$

$$L = \begin{bmatrix} 0 & -1.2179e+03 & -1.4745e+03 & -1.3858e+03 & 1 & 299.3290 & 63.1667 \\ -1.2179e+03 & 0 & -1.5898+03 & -2.6391e+03 & 1 & 115.1250 & 192.1720 \\ -1.4745e+03 & -1.5898e+03 & 0 & -1.4840e+03 & 1 & 366.9180 & 318.76 \\ -1.3858e+03 & -2.6391e+03 & -1.4840e+03 & 0 & 1 & 543.596 & 120.167 \\ 1 & 1 & 1 & 1 & 0 & 0 & 0 \\ 299.3290 & 115.1250 & 366.9180 & 543.596 & 0 & 0 & 0 \\ 63.1667 & 192.1720 & 318.76 & 120.167 & 0 & 0 & 0 \end{bmatrix}$$

Step S43: constructing the coordinate transformation mechanism 120 based on a coordinate transformation between the standard image position and the standard screen position.

Assume that a standard image position obtained via the image detecting sensor 160 is p(u,v); the standard screen position of the standard calibration points 600 relative to the standard optical touch display 100 is P(x,y); and the coordinate transformation formula of the coordinate transformation mechanism 120 applied to the disclosure is represented as a linear algebraic equation, Y=LW, wherein Y corresponds to the P(x,y); L is the Thin plate spline (TPS) of the origin p(u,v) and every calibration point; and W is the coefficient matrix of this coordinate transformation. It is noted that any type of thin plate spline (TPS) is applicable to the disclosure. The mathematical form of Y=LW is presented as:

$$K = \begin{bmatrix} 0 & U(r_{12}) & \ldots & U(r_{1n}) \\ U(r_{21}) & 0 & \ldots & U(r_{2n}) \\ \vdots & \vdots & \ddots & \vdots \\ U(r_{n1}) & U(r_{n2}) & \ldots & 0 \end{bmatrix}, n \times n;$$

$$P = \begin{bmatrix} 1 & u_1 & v_1 \\ 1 & u_2 & v_2 \\ \vdots & \vdots & \vdots \\ 1 & u_n & v_n \end{bmatrix}, n \times 3;$$

$$L = \begin{bmatrix} K | P \\ P^T | O \end{bmatrix}, (n+3) \times (n+3);$$

$$W^T = \begin{bmatrix} w_{1x} & w_{2x} & \ldots & a_{0x} & a_{ux} & a_{vx} \\ w_{1y} & w_{2y} & \ldots & a_{0y} & a_{uy} & a_{vy} \end{bmatrix}, (n+3) \times 2;$$

$$Y^T = \begin{bmatrix} x_1 & x_2 & \ldots & 0 & 0 & 0 \\ y_1 & y_2 & \ldots & 0 & 0 & 0 \end{bmatrix}, (n+3) \times 2;$$

Here is an example to illustrate how the coordinate transformation mechanism 120 operates. Assume that the image detecting sensor 160 has already obtained four standard image positions of the standard calibration points 600; i.e., the p(u,v) of the four standard calibration points 600 are p1=(299.329,63.1667), p2=(115.125,192.172), p3=(366.918,318.76), and p4=(543.596,120.167). In addition, the standard screen positions P(x,y) corresponding to these four standard calibration points 600 are P1=(150,160), P2=(150,610), P3=(710,610), and P4=(710,160).

Placing the abovementioned coordinates into the formula to obtain Y and L:

then placing Y and L into Y=LW to find $$W = \begin{bmatrix} -0.0554 & -0.0535 \\ 0.0449 & 0.0433 \\ -0.0322 & -0.0311 \\ 0.0427 & 0.0413 \\ -369.4002 & 322.7295 \\ 1.5948 & -0.731 \\ 1.7168 & 1.9033 \end{bmatrix}.$$

Since W is the coefficient matrix of this coordinate transformation, the coordinate transformation between the standard image position p(u,v) and the standard image position P(x,y) can be defined while W is known. Therefore, the construction of the coordinate transformation mechanism 120 is completed. It is noted that in the coordinate transformation mechanism 120, each of the standard image positions p(u,v) and each of the corresponding standard screen positions P(x, y) are all stored in the memory 20 of the optical touch display 1 of the disclosure for use as the standard data for implementing the calibration and coordinate transformation of the optical touch display 1.

Because the standard optical touch display 100 is identical to the optical touch display 1 in terms of size and the specifications of the internal devices installed within it, the coordinate transformation mechanism 120 can be employed as a foundation coordinate transformation mechanism for calibrating and implementing the coordinate transformation for the optical touch display 1. Therefore, once the first image positions of each representative calibration point 501 relative to the plurality of image detecting sensors 60 are obtained and the first screen positions of each representative calibration point 501 relative to optical touch display 1 are known form the standard optical touch display 100, the coefficient matrix W can be calibrated accordingly by placing the first image position and the first screen position into the coordinate transformation mechanism 120. Therefore, the coordinate transform mechanism 120 of the optical touch display 1 of the disclosure is constructed consequently.

Step S5: calculating a relative position between each representative calibration point 501 and its neighboring calibration points 500.

After the coordinate transformation mechanism 120 is constructed, the memory 20 of the optical touch display 1 of the disclosure stores each standard image position p(u,v) of the standard optical touch display 100. It can be seen from FIG. 2 that the relative distance of the image position p(u,v) between each representative calibration point 501 and its neighboring calibration points 500 is fixed. Furthermore, because the standard screen position of the 80 standard calibration points 600 of the standard optical touch display 100 are identical to the optical touch display 1 of the disclosure, the relative position between each representative calibration point 501 and its neighboring calibration points 500 can be calculated from the standard image position p(u,v) of the standard optical touch display 100 by using the relative position generating module 50.

Step S6: calculating a second image position of each calibration point 500 relative to the plurality of image detecting sensors 60 based on the relative position and the first image position.

After the relative position between each representative calibration point 501 and its neighboring calibration points 500 is known, the second image position of each calibration point 500 relative to the plurality of image detecting sensors 60 can be calculated by the image position calculating module 70 based on the relative position and the first image position of each representative calibration point 501.

Step S7: calculating a second screen position of each calibration point 500 relative to the optical touch display 1 via the coordinate transformation mechanism 120 and the second image position.

After the second image positions of each calibration point 500 relative to the plurality of image detecting sensors 60 are calculated, the second image positions of each calibration point 500 are placed into the coordinate transformation mechanism 120 to calculate the second screen position of each calibration point 500 to complete the calibration steps of the optical touch display 1 of the disclosure. It is noted that the steps of the calibration method of the disclosure are not limited to the abovementioned order; as long as the aim of the disclosure is accomplished, the order of the abovementioned steps can be changed.

It is noted that, in order to obtain accurate first image positions of each representative calibration point 501, the following steps can be implemented before the plurality of image detecting sensors obtains a first image position of each representative calibration point relative to the plurality of image detecting sensors:

Step S21: placing a calibration template 200 to cover the optical touch display 1, wherein the calibration template 200 comprises a plurality of opening holes 201 and whose positions correspond to the plurality of representative calibration points 501.

As shown in FIG. 2, while the optical touch display 1 is being calibrated, the calibration template 200 covers the optical touch display 1. The calibration template 200 in this embodiment has 10 opening holes, and the positions of these are identical to the positions of the plurality of representative calibration points 501.

Step S22: passing a touching object 300 through the plurality of opening holes 201 to point to each representative calibration point 501 to obtain the first image position of each representative calibration point 501 relative to the plurality of image detecting sensors 60 via the plurality of image detecting sensors 60.

While the calibration template 200 covers the optical touch display 1, the touching object 300 passes through the plurality of opening holes 201 for precisely capturing the image of each representative calibration point 501 relative to the two image detecting sensors 60; therefore, the first image position of each representative calibration point 501 (10 representative calibration points 501 in this embodiment) relative to the two image detecting sensors 60 can be obtained.

To sum up, in the calibration method of the disclosure, the relative position between each representative calibration point 501 and its neighboring calibration points 500 of the optical touch display 1 of the disclosure can be obtained from the standard screen position and the standard image position of the standard calibration points 600 of the standard optical touch display 100. Consequently, the calibration points needed for calibrating the optical touch display 1 of the disclosure can be reduced to the plurality of representative calibration points 501. Therefore, the calibration time can be significantly reduced while the optical touch display 1 is being mass produced by using the calibration method of the disclosure.

It must be noted that the above-mentioned embodiments are only for illustration. It is intended that the disclosure covers modifications and variations of this disclosure provided that they fall within the scope of the following claims and their equivalents. Therefore, it will be apparent to those skilled in the art that various modifications can be made to the structure of the disclosure without departing from the scope or spirit of the disclosure.

What is claimed is:

1. A calibration method for calibrating an optical touch display, wherein the optical touch display comprises a plurality of image detecting sensors, the calibration method comprising the following steps:
   generating a plurality of calibration points;
   generating a plurality of representative calibration points from the plurality of calibration points;
   obtaining a first image position of each representative calibration point relative to the plurality of image detecting sensors via the plurality of image detecting sensors;
   constructing a coordinate transformation mechanism for transforming the first image position of each representative calibration point relative to the plurality of image detecting sensors to a first screen position of each representative calibration point relative to the optical touch display;
   calculating a relative position between each representative calibration point and its neighboring calibration points;
   calculating a second image position of each calibration point relative to the plurality of the image detecting sensors based on the relative position and the first image position; and
   calculating a second screen position of each calibration point relative to the optical touch display via the coordinate transformation mechanism and the second image position.

2. The calibration method as claimed in claim 1, wherein constructing the coordinate transformation mechanism comprises the following steps:
   generating a plurality of standard calibration points on a standard optical touch display and storing a standard screen position of each standard calibration point relative to the standard optical touch display;
   obtaining a standard image position of each standard calibration point via the plurality of image detecting sensors of the standard optical touch display; and
   constructing the coordinate transformation mechanism based on a coordinate transformation between the standard image position and the standard screen position.

3. The calibration method as claimed in claim 2, wherein the relative position is calculated from the standard image position of each standard calibration point.

4. The calibration method as claimed in claim 3, wherein before the first image position of each representative calibration point relative to the plurality of image detecting sensors is obtained via the plurality of image detecting sensors, the calibration method further comprises the following steps:
   placing a calibration template to cover the optical touch display, wherein the calibration template comprises a plurality of opening holes whose positions correspond to the plurality of representative calibration points; and
   passing a touching object through the plurality of opening holes to point to the plurality of representative calibration points to obtain the first image position of each representative calibration point relative to the plurality of image detecting sensors via the plurality of image detecting sensors.

5. A calibration apparatus for calibrating an optical touch display, wherein the optical touch display comprises a plurality of image detecting sensors, the calibration apparatus comprising:
   a processor electrically connected to the plurality of image detecting sensors;
   a memory electrically connected to the processor, a plurality of instructions stored in the memory, and the processor reading the plurality of instructions to perform the following mechanism:
   generating a plurality of calibration points via a calibration point generating module;
   generating a plurality of representative calibration points from the plurality of calibration points via a representative calibration point generating module;
   obtaining a first image position of each representative calibration point relative to the plurality of image detecting sensors via the plurality of image detecting sensors;
   transforming the first image position of each representative calibration point relative to the plurality of image detecting sensors to a first screen position of each representative calibration point relative to the optical touch display via a coordinate transformation mechanism;
   calculating a relative position between each representative calibration point and its neighboring calibration points via a relative position generating module;
   calculating a second image position of each calibration point relative to the plurality of image detecting sensors via an image position calculating module based on the relative position and the first image position; and
   calculating a second screen position of each calibration point relative to the optical touch display via the coordinate transformation mechanism and based on the second image position.

6. The calibration apparatus as claimed in claim 5, wherein the processor is a control chip and the control chip is disposed on the optical touch display.

7. The calibration apparatus as claimed in claim 6 comprising:
   a calibration template covering the optical touch display comprising a plurality of opening holes whose positions correspond to the plurality of representative calibration points; and
   a touching object for passing through the plurality of opening holes to point to the plurality of representative calibration points to obtain the first image position of each representative calibration point relative to the plurality of image detecting sensors via the plurality of image detecting sensors.

8. An optical touch display comprising:
   a plurality of image detecting sensors;
   a processor electrically connected to the plurality of image detecting sensors;
   a memory electrically connected to the processor, a plurality of instructions stored in the memory, and the processor reading the plurality of instructions to perform the following mechanism:
   generating a plurality of calibration points via a calibration point generating module;
   generating a plurality of representative calibration points from the plurality of calibration points via a representative calibration point generating module;
   obtaining a first image position of each representative calibration point relative to the plurality of image detecting sensors via the plurality of image detecting sensors;
   transforming the first image position of each representative calibration point relative to the plurality of image detecting sensors to a first screen position of each representative calibration point relative to the optical touch display via a coordinate transformation mechanism;
   calculating a relative position between each representative calibration point and its neighboring calibration points via a relative position generating module;
   calculating a second image position of each calibration point relative to the plurality of image detecting sensors via an image position calculating module based on the relative position and the first image position; and
   calculating a second screen position of each calibration point relative to the optical touch display via the coordinate transformation mechanism and based on the second image position.

9. The optical touch display as claimed in claim 8, wherein the plurality of image detecting sensors is a plurality of photo sensors or a plurality of optical cameras.

10. The optical touch display as claimed in claim 8, wherein the processor is a control chip.

* * * * *